US005886334A

United States Patent [19]

D'Entremont et al.

[11] Patent Number: 5,886,334

[45] Date of Patent: *Mar. 23, 1999

[54] SYSTEMS AND METHODS FOR RECORDING DATA

[75] Inventors: William D'Entremont, Boxborough; Mark Mesher, Wenham, both of Mass.; Michael O'Dea, Bedford, N.H.; Myron Waite, Bedford, Mass.

[73] Assignee: LAU Technologies, Littleton, Mass.

[ * ] Notice: The term of this patent shall not extend beyond the expiration date of Pat. No. 5,646,388.

[21] Appl. No.: 795,945

[22] Filed: Feb. 5, 1997

Related U.S. Application Data

[63] Continuation of Ser. No. 316,041, Sep. 30, 1994, Pat. No. 5,646,388.

[51] Int. Cl.$^6$ ................................ G06K 5/00; G06K 7/00

[52] U.S. Cl. ................................ 235/380; 235/436

[58] Field of Search ................................ 235/380, 387, 235/375, 381, 482; 382/112, 115, 118, 309; 352/405; 902/4, 3

[56] References Cited

U.S. PATENT DOCUMENTS

| | | | |
|---|---|---|---|
| 4,459,021 | 7/1984 | Blazek | 356/71 |
| 4,616,327 | 10/1986 | Rosewarne et al. | 364/518 |
| 4,660,221 | 4/1987 | Dlugos | 380/23 |
| 4,687,526 | 8/1987 | Wilfert | 156/64 |
| 4,754,487 | 6/1988 | Newmuis | 382/2 |
| 4,864,108 | 9/1989 | Hamada et al. | 235/379 |
| 4,934,846 | 6/1990 | Gilham | 400/104 |
| 4,993,068 | 2/1991 | Piosenda et al. | 380/23 |
| 5,003,405 | 3/1991 | Wulforst | 358/400 |
| 5,025,399 | 6/1991 | Wendt et al. | 364/519 |
| 5,151,582 | 9/1992 | Fujioka | 235/469 |
| 5,157,424 | 10/1992 | Craven et al. | 346/160 |
| 5,181,786 | 1/1993 | Hujink | 400/61 |
| 5,199,081 | 3/1993 | Saito et al. | 382/2 |
| 5,268,963 | 12/1993 | Monroe et al. | 380/23 |
| 5,272,322 | 12/1993 | Nishida et al. | 235/462 |
| 5,337,358 | 8/1994 | Axelrod et al. | 380/23 |
| 5,384,859 | 1/1995 | Bolza-Schunemann et al. | 382/1 |
| 5,432,864 | 7/1995 | Lu et al. | 382/118 |

FOREIGN PATENT DOCUMENTS

| | | | |
|---|---|---|---|
| 0513885 | 11/1992 | European Pat. Off. | 235/380 |
| 513885 | 11/1992 | European Pat. Off. . | |
| 0307181 | 12/1990 | Japan | 235/380 |
| 2-307181 | 12/1990 | Japan . | |
| 3-90994 | 4/1991 | Japan . | |
| 3-269787 | 12/1991 | Japan . | |
| 4-123189 | 4/1992 | Japan . | |
| WO 92/17856 | 10/1992 | WIPO . | |

*Primary Examiner*—Thien Minh Le
*Attorney, Agent, or Firm*—Lahive & Cockfield, LLP; Anthony A. Laurentano

[57] ABSTRACT

Systems and methods for manufacturing and inspecting documents having information recorded thereon include a visual inspection cell, a recording unit, and a packaging unit. The manufactured documents can include driver's licenses, credit cards, military identification cards, welfare cards, social security cards, and other such cards having information recorded thereon suitable for identifying persons or objects. In an optional embodiment of the invention, the manufactured documents include a laminated overlay that includes a holographic overlay as a security feature and the visual inspection cell includes a lighting unit and camera adapted to illuminate and image the recorded data positioned behind the hologram.

28 Claims, 4 Drawing Sheets

SYSTEMS AND METHODS FOR RECORDING DATA

This application is a continuation application of Ser. No. 08/316,041 filed on Sep. 30, 1994, now U.S. Pat. No. 5,646,388. The contents of all of the aforementioned application(s) are hereby incorporated by reference.

FIELD OF THE INVENTION

The present invention relates generally to apparatus and methods for recording data onto a document and more particularly, to apparatus and methods for recording text, image and graphic data onto a document and for automatically inspecting the recorded data.

BACKGROUND OF THE INVENTION

Presently, data recording systems exist that can record graphic, text and image data onto identification documents, such as driver's licenses, military identification cards, and school identification cards. For example, systems exist that manufacture driver's licenses which include a printed image of the driver, text data, a bar code, a fingerprint image, and a magnetic stripe. These improved identification cards can carry more information and are more difficult to forge than conventional identification cards which typically only include a photographic image, a standard graphic image and a block of text data.

Although these improved identification cards have many advantages over the conventional identification cards, the manufacture of these improved identification cards has proven to be more complex than the manufacture of traditional identification cards. In particular, the implementation of an inspection and quality control system for regulating the quality of each recorded data format is more time consuming and expensive than the inspection of the traditional identification card.

The systems presently employed for inspecting these improved identification cards are relatively unsophisticated. Typically, the inspection is manually performed with operators that inspect each card, or select ones of the cards, to detect smudges, missing pictures and other gross errors that are readily detectable by manual inspection. These unsophisticated prior art systems are relatively cumbersome, ineffective and expensive to operate. Moreover, the manual inspection operation only detects printing or recording errors, and fails to detect typographical errors and other misprints. Therefore, a barcode that is printed without smudges will pass inspection even if the recorded data is incorrect or meaningless.

Additionally, the acuity of these manual inspection systems is fairly poor, for example, these manual inspection systems are ill equipped to detect subtle changes in the recording process, such as a lightening of the recorded text, or a slight tilt of a printed image. Therefore, these manual inspection systems are unable to detect conditions that indicate future failures in the system, such as running out of ink or loose printing heads. Similarly, manual inspection is poorly suited for detecting errors, like blurring or smudges, in complex images, such as two-dimensional barcodes or finger print images.

Also troublesome is the inability to detect non-uniformity between identification cards manufactured at different manufacturing stations. Because the uniformity of the recorded data is effected by the age and type of printer that records the image onto the card, there can be a wide range of darkness levels for the images recorded by different manufacturing stations. Although these different darkness levels can be quite pronounced when cards are compared side-by-side, subtle differences are difficult for a human inspector to detect. This lack of uniformity makes it more difficult to detect forgeries and, therefore, reduces the security provided by the identification card.

A further problem with the present systems for inspecting identification cards arises with the incorporation of security features such as holographic overlays. These holographic overlays are highly reflective of light and, therefore, can obscure the text, image or graphic data beneath the overlay and make manual inspection difficult.

Accordingly, an object of the present invention is to provide an improved unitary system for manufacturing and inspecting identification cards having data recorded in different formats.

Another object of the invention is to provide systems and methods for recording and inspecting data records each having different data recorded thereon.

A further object is to provide a system for recording data that reduces the labor costs associated with quality control and inspection.

Another object of the present invention is to provide a system for recording data that increases the uniformity of printed data between identification cards.

Yet another object of the present invention is to provide systems and methods that can inspect the data recorded onto an identification card having a holographic overlay.

Still another object of the present invention is to provide systems and methods for manufacturing identification cards that detect changes in the recording process and operation of the system.

These and other objects of the present invention will be made apparent by the following description of the invention.

SUMMARY OF THE INVENTION

The present invention provides systems and methods for manufacturing and inspecting identification cards, such as drivers' licenses, school identification cards, welfare identification cards and other cards that have descriptive information recorded thereon. The systems and methods provide for the high speed manufacture of identification cards that include information recorded onto the card in multiple formats. Recorded information encompasses information that has been applied to the card by printing, lithography, photographic exposure, or any other technique that can fix information on an document.

Most commonly, identification cards are provided to those members of the general population that are formally registered with an organization or agency that provides registered persons with access to restricted areas, materials or privileges. Typically, an identification card is a small plastic card that includes information specific to the individual associated with the identification card. However, an identification card, as the term is used herein, can be any document that includes information descriptive of a person or object, and can include paper documents, such as passports and birth certificates, or any other medium capable of carrying recorded information.

In one aspect, the present invention includes a production element for recording data onto a blank card, an inspection system that inspects the data which has been recorded onto the blank card to identify those cards which have been defectively manufactured, and a packaging unit that can place each of the manufactured identification cards into a carrier element, such as an envelope, and address the envelope for delivery to the individual associated with the card. In a preferred embodiment of the invention, the inspection system is a visual inspection system that includes an image acquisition element, such as a camera, for generating an image of the identification card and the information recorded thereon and further includes an image processor that can compare the acquired image of the identification card with the data record file that was used to generate the card. Each identification card contains information that is distinct from the other identification cards. Therefore, one aspect of the present invention provides systems and methods that coordinate an inspection element to collect information about each identification card and to compare the acquired information to the individual data record that was used to generate that specific card. Consequently, the present invention provides systems and methods that can be employed to visually inspect a series of distinct identification cards.

In one embodiment of the present invention, the inspection system includes a collection element that individually, and preferably in sequence, removes each identification card from a collection bin and sequentially disposes each identification card in a fixture arranged to allow a camera element to generate image signals representative of the identification card, and more particularly of the information recorded onto the identification card. In a preferred embodiment of the present invention the collection element is a robotic arm collection element that includes a vacuum end effector that can pneumatically couple to an identification card stored in the collection bin.

In one embodiment, the recording unit includes a bar code recorder that records an identification signal that uniquely identifies the identification card being manufactured by the system. Similarly the inspection element can include a bar code reader element that can decode the identification signal printed on the identification card. The inspection element can include a computer interface that couples to a job builder unit that includes a database memory which stores the data records of the identification cards being generated. The inspection element can request from the job builder unit the data record that corresponds to the identification signal decoded by the inspection element. The job builder unit transmits over a computer interface, such as a serial interface, parallel interface, network interface or other such conventional computer interface, the data record associated with the identification card presently being inspected by the inspection element. The inspection element compares the information acquired from the identification card with the information stored in the data record and generates a manufactured fail/manufactured successful signal that indicates whether any manufacturing errors were detected during the inspection. The collection element stores the inspected identification card in a bin that is mechanically coupled to the packaging element.

The packaging element collects each identification card stored in the bin and passes the identification card through a decoder unit that decodes an identification signal recorded onto the identification card. In one embodiment of the invention the identification card includes a magnetic stripe that is encoded with the identification signal. The packaging element includes a magnetic stripe reader that can decode the magnetically encoded identification signal on the card and may also include a memory element that temporarily stores the identification signal of the card being packaged. The packaging element includes a computer interface that interfaces to the inspection element. The packaging element receives an identification signal from the inspection element and compares the stored identification signal with the received identification signal to determine if the two signals match.

In one embodiment of the invention, the inspection system sends a signal to the packaging unit that indicates whether the card selected by the packaging unit successfully passed inspection. The signal can be a false identification signal that generates an error when compared with the decoded by the magnetic stripe unit. The packaging unit may include a rejection bin and a mechanical linkage assembly that carries any defective card from the magnetic stripe reader and to a rejection bin. In this way the system removes those cards that failed to manufacture correctly those cards that failed to manufacture correctly.

The packaging element typically includes a mechanical linkage that places each identification card into a separate carrier element, such as an envelope. The packaging element receives the data record from the inspection element and prints an address on each carrier element that corresponds to an address stored in the data record. The packaged identification cards may be placed in an output bin for delivery to the mail.

In another aspect of the present invention, the present invention provides systems and methods for inspecting identification cards that have been manufactured with a holographic overlay. In one embodiment of the invention, the inspection system includes a camera element for acquiring images of the information recorded onto the identification card. The inspection element includes a lighting unit that can generate light of select intensity, and polarity. The lighting unit illuminates the identification card with polarized light having a polarization and an angle of incidence selected to maximize the appearance of the hologram in an image signal captured by the camera element of the inspection elements. Alternatively, the lighting elements can include uniform lighting sources that are pitched to illuminate the data card in a manner that illuminates the information recorded behind the holographic overlay so that the camera elements can "see through" the holographic overlay and acquire an image of the information recorded behind the holographic overlay.

In another aspect of the invention, the system includes a data collection element for collecting and storing information to be recorded onto the identification cards. The system includes a network job builder that assembles collected information into data records which are sent to the manufacturing system for generating the identification card. The system typically includes data acquisition elements, such as cameras, bar code readers. magnetic stripe readers, and other such collection elements, for collecting information to store in the data record from the collected information the job builder assembles from the collected information data records having fields organized for storing information in the selected formats. These data records may be conventional computer files having fields defined by the type of information stored therein, such as an address field, an image field, a birth date field, and other such information fields. The job builder includes a processor element that assembles one or more of the data records into a batch file and generates commands to the manufacturing system to generate identification cards for one or more of the data records stored in the batch file.

The invention will next be described in connection with certain illustrated embodiments; however, it should be clear to those skilled in the art that various modifications, additions and subtractions can be made without departing from the spirit or scope of the claims.

DETAILED DESCRIPTION OF THE ILLUSTRATED EMBODIMENT

Figure 1:
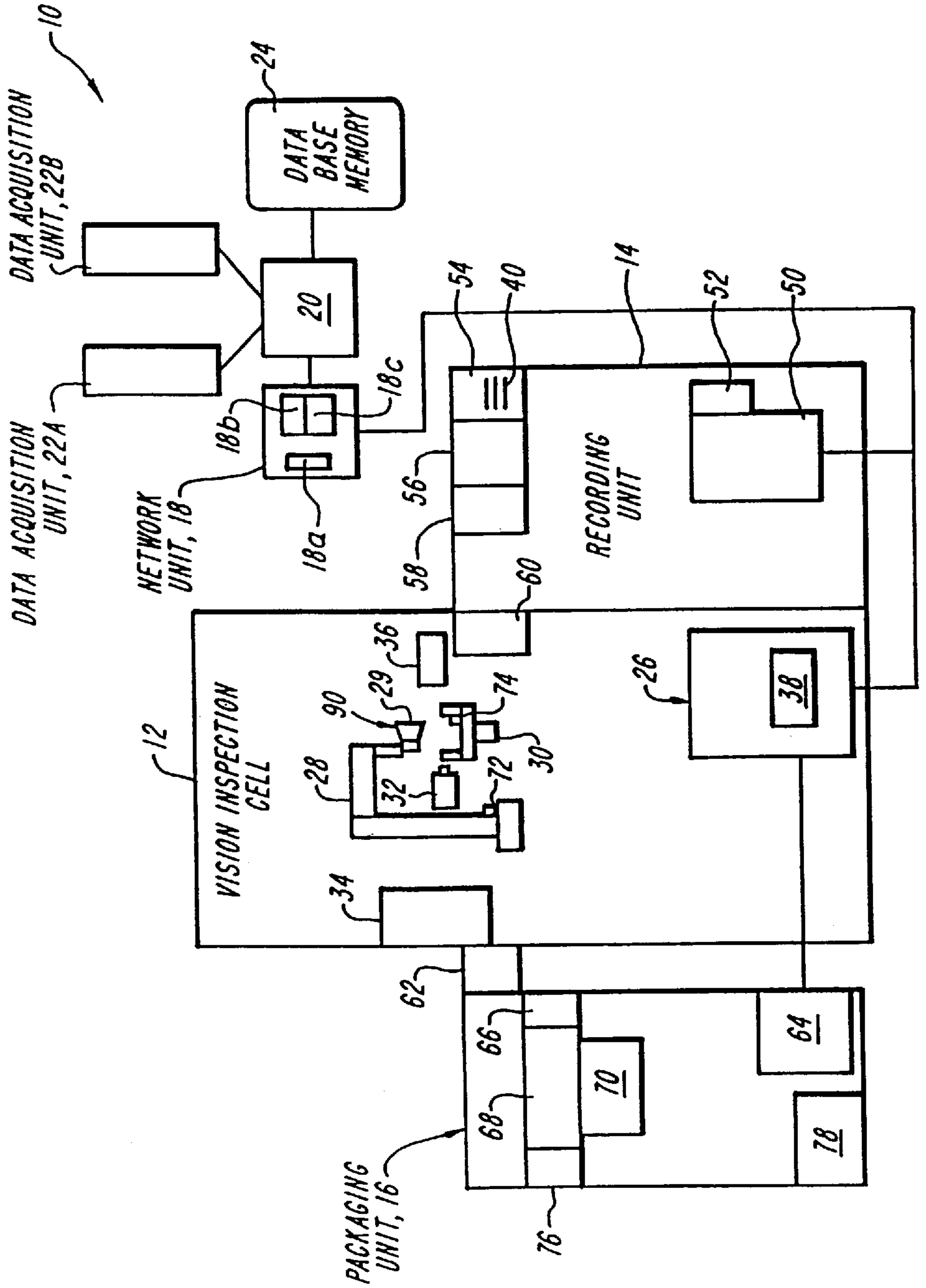
FIG. 1 illustrates one system constructed according to the present invention for manufacturing identification cards.

FIG. 1 illustrates an identification card manufacturing system 10 constructed according to the present invention. The illustrated system 10 includes a vision inspection cell 12, a recording unit 14, a packaging unit 16, a network job builder unit 18, a central image server 20, optional data acquisition units 22A and 22B, and an optional database memory 24.

In one aspect of the invention, the system 10 provides an identification card manufacturing system that manufactures, inspects, and packages identification cards such as drivers' licenses, credit cards, military identification cards and other such cards having recorded information thereon. In one embodiment, the system 10 manufactures identification cards that include image, text, and graphic data recorded thereon and that further include magnetic stripes having information magnetically encoded thereon. These systems can manufacture such identification cards at rates of 120 cards per hour. The illustrated system 10 is suited for attachment to a computer network system, such as a local area network or a wide area network or other such processing network, and can be one component in a larger system that can be employed to maintain a registry of individuals that have been authorized access to a restricted area, privilege or action. For example the system 10 illustrated in FIG. 1 can be one component in a system employed by the Registry of Motor Vehicles for maintaining a database of all individuals in one state that have been granted authority to operate a motor vehicle on the state's highways, and that grants a driver's license to each authorized individual.

As illustrated in FIG. 1, and as will be explained in greater detail hereinafter, the system 10 can include four primary components. The first component can be a job builder unit that includes the network job builder unit 18, the central image server 20, that database memory 24 and one or more data acquisition units 22A and 22B. The job builder can be a part of a registry system that collects and integrates all the necessary information for identifying and registering each individual into the system. For example, the data acquisition units 22A and 22B, can collect identifying information about the individual, such as a photograph of the individual, a fingerprint of the individual, an image of the individual's signature, and other such identifying data. Similarly the database memory 24 can connect to an optional keyboard and monitor that can be operated by personnel at the Registry of Motor Vehicles or the Department of Welfare and Human Resources, and can store various demographic data regarding each person being registered into the system. The information stored in database 24 can include the individual's address, age, their various restrictions, privileges, or entitlements relevant to the individual's status in the system and other such data. In one practice of the invention, at the end of each day the network job builder assembles all the information about each of the individual's being registered into the system and can generate a manufacturing batch file that requests the system to generate an identification card for each new applicant. The manufacturing batch file typically consists of a series of individual data records each containing information relevant to one individual applicant and each having an identification signal, such as a social security number, that distinguishes one record from the next.

The second primary component of the system 10 includes a recording unit that can respond to the manufacturing batch files generated by the network job builder and print the relevant information, including the identification signal, onto a data card 90 such as a small plastic identification card, thereby manufacturing an identification for each applicant registered into the system that day. The recording unit 14 can pass the printed data cards to the vision inspection cell 12 and that is the third primary component of the system 10. The vision inspection cell 12 can inspect each data card 90 manufactured by the recording unit 14 to identify printing errors, poor quality or other such defects. The vision inspection cell 12 includes a unit for reading the identification signal of the data card 90 being inspected, and accessing the data record used to make that card. Vision inspection cell 12 causes the defective cards to be rejected by the system 10 and, in a preferred embodiment be re-manufactured by the recording unit 14. The fourth primary component is the packaging unit 16 that receives inspected cards from the vision inspection cell 12 and places each card into an addressed envelope, applies the proper postage, and places the manufactured identification card in an output bin ready to be mailed to the newly authorized applicants. Therefore as can be seen from the above description, and as will be explained in greater detail hereinafter, the system 10 provides an integrated system for manufacturing data cards that includes collecting the necessary data, recording the data onto a suitable identification card, inspecting the recorded data and packaging the completed identification cards for delivery to the authorized individuals.

The illustrated system 10 depicts a manufacturing system constructed for manufacturing identification cards such as driver's licenses, credit cards, military identification cards, welfare cards, social security cards, and other such cards having information recorded thereon suitable for identifying persons or objects. The data for recording onto the identification card is collected by the data acquisition units 22A and 22B, collected from in a database 24, or collected from both the acquisition units 22A and 22B and a database 24. As will be explained in greater detail hereinafter, the network job builder 18 receives document manufacture requests from the central image server 20 and status reports from the vision inspection cell 12. The central image server 20 generates the document manufacture requests from the image files transmitted from the acquisition units 22A and 22B, and stored in a data memory within the central image server 20. The central image server 20 collects and processes information records from the database 24 and integrates these information records with image files stored in the central image server data memory. These integrated files may be data records having image, text, graphic and other types of data. Each data record is normally associated with one document, being manufactured by the system 10 and may be part of the document manufacture request transmitted to the network job builder 18. The data record can be a conventional data record file of the type commonly used to store and organize data into fields and strings.

As further illustrated in FIG. 1, the network job builder unit 18 is connected via transmission paths to the vision inspection cell 12, the recording unit 14, and the central image server 20. The central image server 20 connects via transmission paths to the data acquisition units 22A and 22B. In the illustrated embodiment, the two data acquisition units 22A and 22B connect to the central image server 20, however it should be apparent to one of ordinary skill of the art of data processing that the present invention can be practiced with any number of image acquisition units 22 and, alternatively, without any image acquisition units 22.

The network job builder 18, central image server 20, data acquisition unit 22 and database memory 24 connect as peripheral units using conventional peripheral interfaces to the vision inspection cell 12 and the recording unit 14. These peripheral units operate to acquire information and to assemble the acquired information into a data batch file suitable for transmission via the transmission path to the recording unit 14 and the vision inspection cell 12. In one embodiment of the present invention, the data acquisition units 22A and 22B can be data capture pylon units of the type described in co-pending U.S. patent application Ser. No. 08/262,552. The data capture pylon acquisition units 22A and 22B acquire information, such as an image of an applicant for a driver's license, an image of the applicant's signature, an image of the applicant's fingerprint, an image of a barcode encoding demographic data regarding the applicant, or other such identifying information as relates to the applicant for driver's license. It may also provide identification information for a magnetic stripe. The data capture pylon acquisition unit 22 connects via a telecommunication transmission path, such as a telecommunication link including a modem to the central image server 20 for downloading the acquired image information to the central image server 20. The central image server 20 may also include a modem unit of the type commonly used for acquiring information from multiple sources over telecommunication lines. The central image server 20 further includes a processing unit and the data memory for storing the acquired image data as an image file in the data memory of the central image server 20. Therefore, the central image 20 can store as a data file in its memory the information acquired for each individual applicant for a driver's license.

In an optional embodiment of the system 10, the central image server 20 connects via a transmission path, such as a telecommunications link, to a database memory 24. In one embodiment the central image server 20 is a conventional data processing system such as the ALPHA computer system manufactured by the Digital Equipment Corporation of Maynard, Mass. and can have a memory element that can store up to five million records. The database memory 24 may be a random access memory, a hard disk drive memory, a floppy disk drive memory, a tape drive memory, a optical disk drive memory, or any other type of memory commonly used for the mass storage of data. In one application of the system depicted in FIG. 1, the database memory 24 stores demographic data for the individual applicants for a driver's license. This information, such as address information, restriction information, and other such data is entered into the database memory unit 24 via keyboard data entry, for example, by an operator at a Registry of Motor Vehicle site. The database memory unit 24 connects via the transmission path to the central image server 20. The central image server 20 downloads data records regarding the demographic data of an applicant for driver's license, and the processing unit of the central image server 20 can open the associated image data file stored in the memory element of the central image server 20 and generate and store a data record file, for each applicant for driver's license, that includes image and text data regarding the applicant for driver's license.

As further illustrated by FIG. 1, the central image server 20 also connects via a transmission path, such as a telecommunication link, to the network job builder unit 18. The network job builder unit 18 includes a processing unit and a memory element. The network job builder unit 18 may be a conventional computer system such as an IBM PC system and preferably is a high speed high performance system such as an IBM PC based on the Pentium chip running at clock rates of 90 megahertz or greater. The processing unit of the network job builder unit 18 downloads information from the central image server 20 via the transmission path, for generating manufacturing batch files. In one embodiment of the invention the manufacturing batch file stores between 50 and 300 data records for manufactured by the system 10. Each manufacturing batch file includes one or more data records and can represent a request by the network job builder 18 for the recording unit 14, visual inspection cell 12 and packaging unit 16 to record, inspect and package a respective data card containing the image and demographic data of each data record in the manufacturing batch file. In the illustrated embodiment the network job builder 18 connects via a transmission path to the recording unit 14 and the vision inspection cell 12. In one embodiment the transmission path may be RS232 serial communication port such as a type commonly used in small computer communications. It should be apparent to one of ordinary skill in the art of computer engineering that other transmission paths, such as parallel paths, SCSI (Small Computer Serial Interface) communication paths, radio frequency links, and other paths suitable for communicating data signals, may be employed in the present invention without departing from the scope thereof.

The vision inspection cell 12 connects via an RS232 port to the network job builder 18. The vision inspection cell 12 includes a central processing unit 26, a collection unit 28, a support fixture 30, a camera element 32, a cell lighting unit 34, a barcode reader 36, and an image buffer memory 38. The recording unit 14 includes a central processing unit 50, a data memory 52, a card source 54, a recorder unit 56, a barcode decoding unit 58 and an input hopper 60. The packaging unit 16 includes an output hopper 62, a central processing unit 64, a magnetic stripe encoder/decoder unit 66, a printer 68 and a packaging assembly unit 70. In an alternative embodiment of the invention, the packaging assembly unit 70 can further include an envelope sealer and a postage metering device.

As depicted in FIG. 1, the network job builder unit 18 connects via a transmission path to the central processing unit 50 of the printing unit 14. In a preferred embodiment of the present invention the transmission path is an RS232serial communication port, and the network job builder unit 18 and the central processing unit 50 contain RS232 serial interface units. Such interface units are of the type commonly used in small computer communications and any of the conventional RS232 communication units can be practiced with the present invention. Furthermore, it should be apparent to one of ordinary skill in the art of computer engineering that alternative communication paths can be practiced with the present invention, including parallel interface such as the IEEE 488 interface, SCSI interface, ISI (Intelligent Standard Interface) interface, telecommunication link, and any other data communication link suitable for transmitting data between one or more data processing devices.

As previously described, the network job builder 18 can include a processing unit 18A, a program memory 18B and a data memory 18C of the type commonly used by data processing devices. The processing unit 18A connects to the data memory 18C and the program memory 18B, and operates according to a set of program instructions stored in the memory 18B to generate a manufacturing batch file that includes a command field and data field. The command field includes signals that actuate the recording unit 14 to record on documents, such as the blank cards 40 located in the card source 54, the one or more data records stored in the data field.

The recording unit 14 illustrated in FIG. 1 is a document manufacture machine of the type suitable for printing in black and white, or in color. The illustrated recording unit 14 records data on one or both sides of the document, such as a 2×3½ in. plastic card, and can record image data, text data and graphic data. In the depicted embodiment the CPU 50 reads the manufacturing batch files generated by the network job builder 18 and generates command signals for the recording unit 56, to record text graphic and image data onto a blank card 40. The recorder 56 includes a mechanical linkage for collecting a blank card 40 from a card source 54 and for moving the card 40 through the recorder 56. The mechanical linkage assembly (not shown) can include sets of rollers having textured exterior surfaces suitable for frictionally engaging a plastic card. The rollers contact the cards 40 in card source 54 and extract the cards 40 one at a time. The mechanical linkage assembly moves each card 40 through the linkage assembly with pairs of rollers radially spaced from each other and connected to motor assemblies that rotate the rollers in opposing directions. The rotating rollers feeds the cards 40 one at a time through the recording unit 14.

As cards 40 move through the recording unit 14, the recorder 56 records text, graphic, image data or combinations thereof onto the card 40. The data recorded onto each card 40 corresponds to a data record stored in the data memory 52. Preferably, the data record includes an identification signal that distinguishes one record from the next. The data record stored in the data memory 52 is typically part of the manufacturing batch file transmitted from the network job builder 18. The CPU 50 controls the recorder unit 56 to select one blank card 40 for each data record stored in the data memory 52. The CPU 50 can control the recorder 56 to record the text, graphic and image data of one data record onto one card 40 moving through the recorder unit 56. The recorder 56 can, therefore, receive one blank card 40 and one data record to generate a data card 90 having data from that data record recorded thereon.

The illustrated recorder 56 includes the barcode unit 58. The barcode unit 58 has a mechanical linkage assembly for collecting each data card 90 having recorded data and includes a barcode printer for recording onto each data card 90 a barcode identification graphic that corresponds to the identification signal field in the associated data record. In one embodiment of the present invention the barcode unit 58 records onto the selected data card 90 a barcode graphic representative of the driver's license number. The recorded driver's license number is one identification signal that can uniquely identify each data card 90 being manufactured by the recording unit 14 and the system 10. In other embodiments and practices of the present invention, the barcode unit 58 has a mechanical linkage that connects to the input hopper 60 and that stores completed data cards 90 in the input hopper 60. The recording unit 14 can be a data card manufacturing unit of the type conventionally used for producing plastic identification cards. One such type is the data card 9000 plastic manufacture machine, sold by the Data Card Corporation in Minnetonka, Minn.

Optionally and preferably, the data card recording unit 14 includes an overlay unit for applying to the data card 90 an overlay on at least one side of the card. The overlay can contain a holographic security feature. The holographic security feature typically is a holographic image that selectively reflects certain wavelengths of radiation. Such holographic security features are well known in the art of data card manufacturing and it should be apparent to one of ordinary skill in the art that any holographic image suitable for reflecting select wavelengths of radiation, and thereby reducing the likelihood that the data card can be optically photocopied with achromatic light, can be practiced with the present invention. In another optional but preferred embodiment of the present invention, the recording unit 14 includes a magnetic stripe or recording unit for recording onto a magnetic stripe fixed to the data card, an identification signal. In one embodiment of the present invention the magnetically recorded identification signal is the driver's license identification number. Other such signals which uniquely identify the data card, can be practiced with the present invention without departing from the scope thereof.

In the illustrated embodiment, a collection unit 28 in the vision inspection cell 12 collects data cards 90 from the input hopper 60. The collection unit 28 in the illustrated embodiment is a robotic arm having a robotic end effector with a vacuum cup grip 29 adapted for removing the data card 90 from the input hopper 60. The robotic arm collection unit 28 collects a data card 90 from the input hopper 60 and moves the data card 90 in front of the barcode reader 36. The illustrated barcode reader 36 has a laser scanning unit for reading a barcode recorded on one side of the data card 90. The barcode reader 36 includes a processing unit for decoding a barcode graphic recorded onto the data card 90. The decoded barcode signal representing the decoded information is transmitted to the CPU 26 and stored in a data memory of the CPU 26. The CPU 26 can use the barcode information to identify the data record in the manufacturing batch file, which is associated with the data card 90 held by the robot arm collection unit 28. In one embodiment, the CPU 26 transmits via the serial interface, a data record request to the network job builder 18 for the data record associated with the decoded identification signal. The processing unit 18A of the network job builder 18 decodes the data record request and retrieves the corresponding data record from a manufacturing batch file stored in the data memory 18B, and transmits the data record to the CPU 26 via the RS-232C interface.

As will be explained in greater detail hereinafter, the vision inspection cell 12 compares the information in the data record against the information recorded on the associated data card 90.

In a preferred embodiment of the invention, the vision inspection system cell 12 includes a sensor 72 connected to the collection unit 28. The sensor 72 has a first condition for indicating when the collection unit 28 is in a first position and a second condition for indicating when the collection unit 28 has moved into a second position. The sensor 72 couples, via a transmission path, to the CPU 38. The CPU 38 connected, via a transmission path to the barcode reader 36, activates the barcode reader 36 upon detecting the activation of the second condition of the sensor 72. In this way the barcode graphic reader 36 can scan the barcode recorded onto the data card as the robot arm collection unit 28 moves the data card from the input hopper 60 to the support fixture 30. The sensor element 72 can be a limit switch, photo-diode and photo-transistor pair, or other sensor capable of detecting the position of the collection unit 28.

The depicted robot arm collection unit 28 is a TT8010 robotic arm manufactured by the Seiko Instruments Corporation. The robotic arm is equipped with a vacuum cup end effector adapted for gripping data cards 90. The vacuum end effector can include a rubber cup having a 1.375 inch diameter and made from neoprene and a vacuum port extending into the cup for producing a vacuum that holds a data card 90 against a cup 29. In a preferred embodiment of the invention, the input hopper 60 includes a stacking unit that has an axial tension rod for holding the data card 90 securely in place as the robot arm collection unit 28 pushes the cup 29 against the stack of data cards 90. The vacuum can be generated by a vacuum pump such as the Fast Vac TT No. VP61-GOH and can create a vacuum sufficient to hold the card 90. The illustrated cup 29 includes a vacuum feedback sensor to detect the presence of a data card 90 at the end effector. The detection of a vacuum at the end effector indicates that a data card 90 is gripped against the end effector. The failure to detect a vacuum indicates that a data card 90 is not present against the cup 29. The vacuum assembly couples via a transmission path to the CPU 26. The CPU 26 monitors the vacuum sensor and the sensor element 72 to determine from the position of the collection element 28 and the presence of a data card 90 at the cup 29, whether the collection unit 28 is properly moving the data card 90 through the system 10. The illustrated inspection cell including the robot arm collection element 28 can inspect the data cards 90 at a rate of 5 cards per minute, can detect data misplacement within 0.03125 inches and can detect smudges, breaks, voids or mispositioning of any text that results in a 0.01564 square inch deviation.

In an alternative embodiment of the present invention, the recording unit 14 passes data cards 90 directly through the vision inspection cell 12 for real-time inspection of the data card 90. In one example of this alternative embodiment the data cards 90 are carried by a conveyor belt and disposed at an imaging station fixture 30 optically coupled to one or more camera stations. The imaging station fixture 30 can be a flat surface where the conveyor belt momentarily pauses to allow the camera element to image the data recorded onto the data card 90. The decoding unit 58 decodes the identification signal as the data card 90 moves along the conveyor belt. The vision inspection cell 12 images each data card 90 as it passes through the vision inspection cell 12, compares the images to the respective data record and passes the data card 90 to the packaging unit 16. These and other embodiments can be practiced with the present invention without departing from the scope thereof.

With reference again to FIG. 1, the illustrated support fixture 30 has a sensor 74 that connects to the support fixture 30 for being able to detect when a data card 90 has been inserted therein. The sensor 74 connects via a transmission path to the CPU 26. The CPU 26 can detect the presence of a data card 90 within the support fixture 30 and activate the camera element 32 to begin the inspection process.

In one embodiment of the present invention the camera unit 32 consists of four camera units. Two camera units are arranged with the support fixture 30 for taking images of the front side of the data card 90. The two other cameras are arranged with the support fixture 30 for taking images of the rear portion of the data card 90. Each set of paired cameras is arranged for taking an image of the left or right portion of one side of the data card 90. As depicted in FIG. 1, the camera unit 32 connects via a transmission path through CPU 26. The CPU 26 can actuate the camera unit 34 by transmitting a control signal via the transmission path to the camera unit 32. In one embodiment of the present invention, the CPU 26 acquires images of the data card 90 in the fixture 30 by acquiring four images of the card, a front left image, a front right image, a back left image, and a back right image. The image data generated by the camera unit 32 is transmitted via the transmission path to the CPU 26. The program sequence operating the CPU 26 generates, for each image acquired from the data card 90, a data file. The data file stores an image signal representative of the image captured by each camera in the camera unit 32. Each data file is stored in the data memory of CPU 26. The CPU 26, further includes an image memory buffer 38. The program sequence operating the CPU 26, stores in the image memory buffer 38, a copy of the image signal transmitted from the network job builder unit 18 for the respective card being manufactured. The CPU 26, generates a comparison signal by comparing the image data acquired from the data card 90 in the fixture 30 with the image data used to manufacture the data card 90 in the recording unit 14 to manufacture the data card 90. The comparison signal is transmitted via the transmission path to the network job builder 18 and stored in a status file that can be transmitted to the control image server 20 as a status report.

As will be described in greater detail hereinafter, the comparison signal includes a status signal that represents the status of the document. The status signal indicates whether the document being inspected has passed or failed the inspection. In one embodiment of the present invention, if a document fails inspection three times, the system 10 declares the document is failed to manufacture and this failure status is sent via the network job builder 18 to the central image server 20. Alternatively, the vision inspection cell 12 can generate a comparison signal having a status signal that indicates that the document is within tolerance. The vision inspection cell 12 can send a document successfully manufactured status signal back to the network job builder 18 and to the control image server 20. Further the vision inspection cell 12 can transmit the magnetic stripe and addressing record for the respective document such as a data card 90, to the packaging unit 16. If the document such as the data card 90, is not within tolerance and the vision inspection cell 12 generates a status signal indicating a failed to manufacture document, the vision inspection cell 12 transmits an invalid magnetic stripe and addressing record to the packaging unit 16. The invalid magnetic stripe an d addressing record cause s the document to fail the magnetic stripe verification pass within the packaging unit 16 and the document is rejected and placed within a reject bin 76.

The illustrated packaging unit 16 is mechanically connected to the vision inspection cell 12 by the output hopper 62 and is electronically coupled to the vision inspection cell 12 by the transmission path that connects CPU 64 with the CPU 26. The packaging unit includes a unit 66, such as the illustrated magnetic stripe reader unit 66, that can decode an identification signal, such as a social security number, recorded onto the data card 90. The illustrated packaging unit 16 receives a data card 90 through the output hopper 62 and receives data record files via the transmission path coupling CPU 64 to CPU 26. The CPU 64 detects the presence of documents in the output hopper 62 by a sensor mechanism located within the output hopper 62. The CPU 64 can activate a mechanical linkage assembly of the type previously described to remove a data card 90 from the output hopper 62 and to insert the card 90 into a magnetic stripe unit 66. CPU 64 further collects from the CPU 26 the data record paired with the document in the magnetic stripe unit 66. In the illustrated embodiment, the CPU 26 reads the data record from the CPU 50 via the serial interface transmission path and store the data record in the data memory within the CPU 64. Alternative data transfer systems for collecting the data record associated with the identification signal read by the packaging unit 16 can be practiced with the present invention without departing from the scope thereof. The illustrated magnetic stripe unit 66 reads the magnetic stripe on the back of the data card and transmits the magnetic stripe information to the CPU 64. The CPU 64 compares the data encoded on the magnetic stripe with the data in the data record file to verify that the magnetic stripe has been encoded correctly and to verify that the data card in the magnetic stripe unit 66 corresponds to the data file stored in the data memory of CPU 64. If the CPU 64 detects that the magnetic stripe has been correctly encoded with the information from the data record and the data memory, a mechanical linkage removes the card from the magnetic stripe unit 66 to the package assembling unit 70.

The CPU 64 transmits via a transmission path, data from the document file associated with the respective card to the printer unit 68. The printer unit 68 addresses a document carrier with the information from the data file. In one embodiment of the invention CPU 64 transmits one field of information to the printer unit 68, typically this field of information is the address record for the data card being manufactured. The printer unit 68 records the address data onto a document carrier. The document carrier is transferred via mechanical assembly to the package assembly 70 that places the data card 90 into the document carrier. A mechanical assembly collects the document carrier and places the document carrier with the enclosed data card 90 into the carrier bin 78.

Alternatively, the packaging unit 16 rejects data card 90 having information misrecorded thereon. In a first practice, the CPU 64 compares the magnetic stripe data read by magnetic stripe unit 66 with data from the data file in the CPU 64 memory. CPU 64 detects errors in the recorded magnetic stripe data and transfers the data card 90 and the magnetic stripe unit 66 via a mechanical assembly to the reject bin 76.

In a preferred practice of the invention, CPU 64 rejects data card 90 to remove from the system 10 those data cards that fail visual inspection within the vision inspection cell 12. In one embodiment of the present invention, the CPU 26 and vision inspection cell 12 detects an error during the visual inspection of a data card 90. The collection unit 28 places the data card 90 into the output hopper 62 and the CPU 26 alters the data field for the respective data card to include a blank signal in the data field. The CPU 26 transfers the data field with the blank signal to the CPU 64 when the corresponding data card 90 is selected from the output hopper 62 and then placed in the magnetic stripe unit 66. The CPU 64 compares the information encoded on the magnetic stripe with the blank signal detects the mismatch and activates the mechanical assembly to remove the data card from the magnetic stripe unit 66 and place the data card into the reject bin 76. In this way, data cards 90 that fail inspection are sorted out of the successfully manufactured cards by the packaging unit 16.

Figure 2:
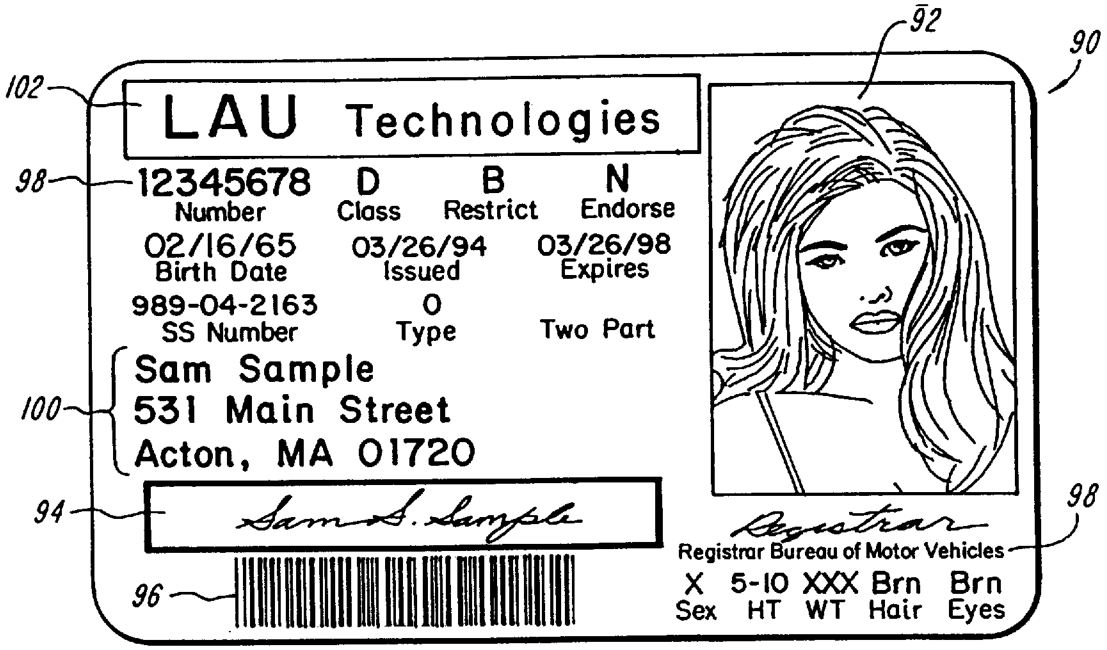
FIG. 2 illustrates a front perspective of an identification card of the type printed by the system illustrated in FIG. 1.
Figure 3:
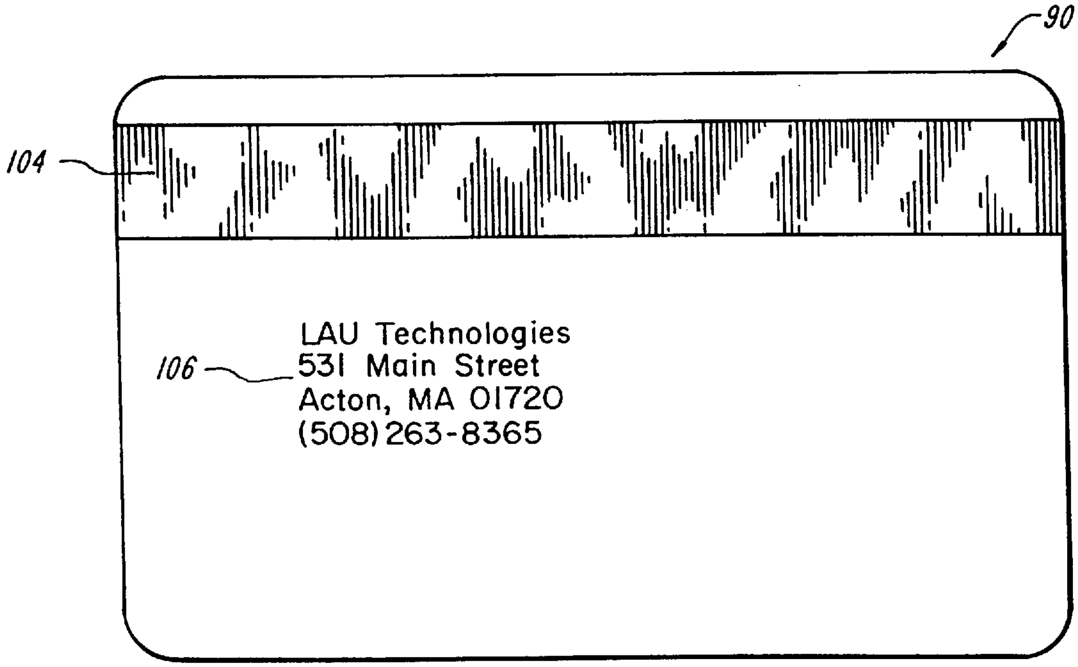
FIG. 3 illustrates a rear perspective of an identification card of the type printed by the system illustrated in FIG. 1.

FIG. 2 depicts one example of a data card 90 that can be manufactured by the illustrated system 10. Data card 90 represents an employee identification card, a driver's license or other such identification card that includes an image 92 of the applicant, a image 94 of the applicant's signature, a barcode 96, a driver's license identification number 98, demographic data 100, and graphics 102. FIG. 3 illustrates a backside of the data card 90 that includes the magnetic stripe 104 and the demographic data 106. The illustrated identification card is a plastic identification card approximately 3½×2 inches and approximately 1⁄32 inch thick. The data card 90 includes a protective overlay of plastic protecting the surfaces and the magnetic stripe of the data card 90. The plastic overlay optionally includes a holographic image printed thereon, to prevent simple photocopy reproductions of the data card 90.

The recording unit 14 of system 10 can be a printing unit for printing on a blank data card the image 92, barcode 96 and demographic data 100. The recording unit 14 can have a printing unit for printing in black and white or in color. It would be apparent to one of ordinary skill in the art that other systems for recording information onto a data card can be practiced with the present invention without departing from the scope thereof. These systems includes lithographic systems, and photo exposure systems, as well as other systems suitable for fixing graphic, text and image data onto a tangible medium.

In a preferred practice of the invention, each data card 90 manufactured by system 10 can have uniform characteristics to increase the difficulty of forgeries. In one example, the system 10 can print each data card 90 with an image 92 that has a uniform lighting characteristic. Additionally, each data card 90 can have graphic data 102 having a uniform orientation on each card 90. For example, the graphic banner 102 illustrated in FIG. 2 can extend horizontally across the data card 90 the vision inspection cell 12 can detect the orientation of graphic banner 102 relative to the horizontal edge of data card 90. The vision inspection cell 12 can generate a signal representative of relative orientation between graphic banner 102 and a card edge. The CPU 26 can compare the orientation signal to a user selected orientation value stored in the CPU 26 data memory. The user selected orientation signal stored in data memory of CPU 26 can represent a range of acceptable orientation deviations. This range is a tolerance for each data card 90 generated by the system 10. Any data card 90 having a graphic 102 that deviates out of tolerance can be rejected by the CPU 26 by transmitting a blank signal when the packaging unit 16 collects the data card 90 from the output hopper 62. The vision inspection cell 12 can inspect and measure other characteristics of the data card 90.

The illustrate d vision inspection cell 12 includes the lighting unit 34 that includes light sources, that will be explained in greater detail hereinafter, for generating an uniform exposure lighting during the acquisition of image data. Consequently, the vision inspection cell 12 acquires images of each data card preferably under consistent and uniform lighting conditions. The image acquisition element 32 acquires image data from the data card 90. As will be explained in greater detain hereinafter, the image acquisition unit in one embodiment includes plural camera elements that generate image data representative of select portions of the data card 90 in the support fixture 30.

In one practice, the separate images are combined together by the CPU 26 to create one image signal representative of the data recorded onto a front side of the card, and one image signal representative of data recorded onto the back side of the card 90. In a preferred embodiment of the vision inspection cell 12, the acquisition unit 32 includes a focusing element to collect images with the same DPI (Dots Per Inch) characteristic as the image signal stored in the data record of the associated data card 90. Typically, the focusing element includes a lens 32A and support fixture that holds the acquisition unit 32 at a select distance from the data card 90. By capturing image signals that have a DPI characteristic similar to the DPI characteristic of the image signals stored in the data record, the vision inspection cell 12 facilitates the efficient inspection of data card 90. In a preferred practice of the invention, the lens element 32A is adaptable to readily adjust the captured image signal to a selected DPI characteristic. This facilitates the use of the vision inspection cell 12 with other recording units 14 that can record data onto a data card 90 with different or varying DPI characteristics.

The image signals captured by the acquisition element 32 are transferred to the CPU 26. In a preferred embodiment of the invention the CPU 26 operates on the acquired image signals to adjust the aspect ratio characteristic of the signal. Typically the CPU 26 adjusts the aspect ratio characteristic of the captured image signal to correspond to the aspect ratio of the image signals stored in the data record associated with the data card 90 being inspected. As is generally known in the art of vision inspection systems, the CPU 26 can be configured as an image processing system that has a image processing programming element that can compare image signals generated by the acquisition element 32 with image signals stored in the data record of the corresponding data card 90. The programming element can operate the CPU 26 according to known techniques in the art of vision inspection.

In one embodiment of the present invention, the programming element operates the CPU 26 to compare the pixel density of the filtered image signal generated by the acquisition element 32 with the pixel density of the image signals stored in the data record. In a preferred practice of the invention the pixel density is compared for select image regions of the image signal. As is generally known in the art of vision inspection, an image region can include one line of pixel data, thereby comparing pixel density on a per line basis. Alternatively, the image processing program element can operate CPU 26 to compare image regions that represent windows of an image, typically being a square or rectangular portion of the image, and to compare the selected window regions between the acquired image signal and the stored image signal. The image processing element can operate the CPU 26 to compare each image region of the acquired image against the corresponding region in the stored image and to generate a comparison signal that indicates whether or not the acquired image signal is substantially representative of the stored image signal. In an optional but preferred embodiment of the invention, the acquisition element 32 and the image processing element of CPU 26, includes color processing apparatus for acquiring color images of the data card 90 and for processing the acquired color images to compare color characteristics between the acquired image signal and the stored image signal. These vision inspection techniques are considered within the scope of one of ordinary skill in the art and modifications, additions and subtractions to these techniques do not depart from the scope of the invention.

A uniform characteristic, as the term is used herein, describes a characteristic of the recorded data, such as pixel density, size, code etc., that is recorded onto the data card 90 within a selected manufacturing tolerance. For example, the orientation of a line of text can be considered uniform if the measured orientation is within ½° of a preferred orientation, such as 90°. Some other characteristics will be explained in greater detail hereinafter, however it should be apparent to one of ordinary skill in the art that these characteristics are merely illustrative and that other characteristics of the data card 90 can be inspected by vision inspection cell 12, without departing from the scope of the invention.

Figure 4:
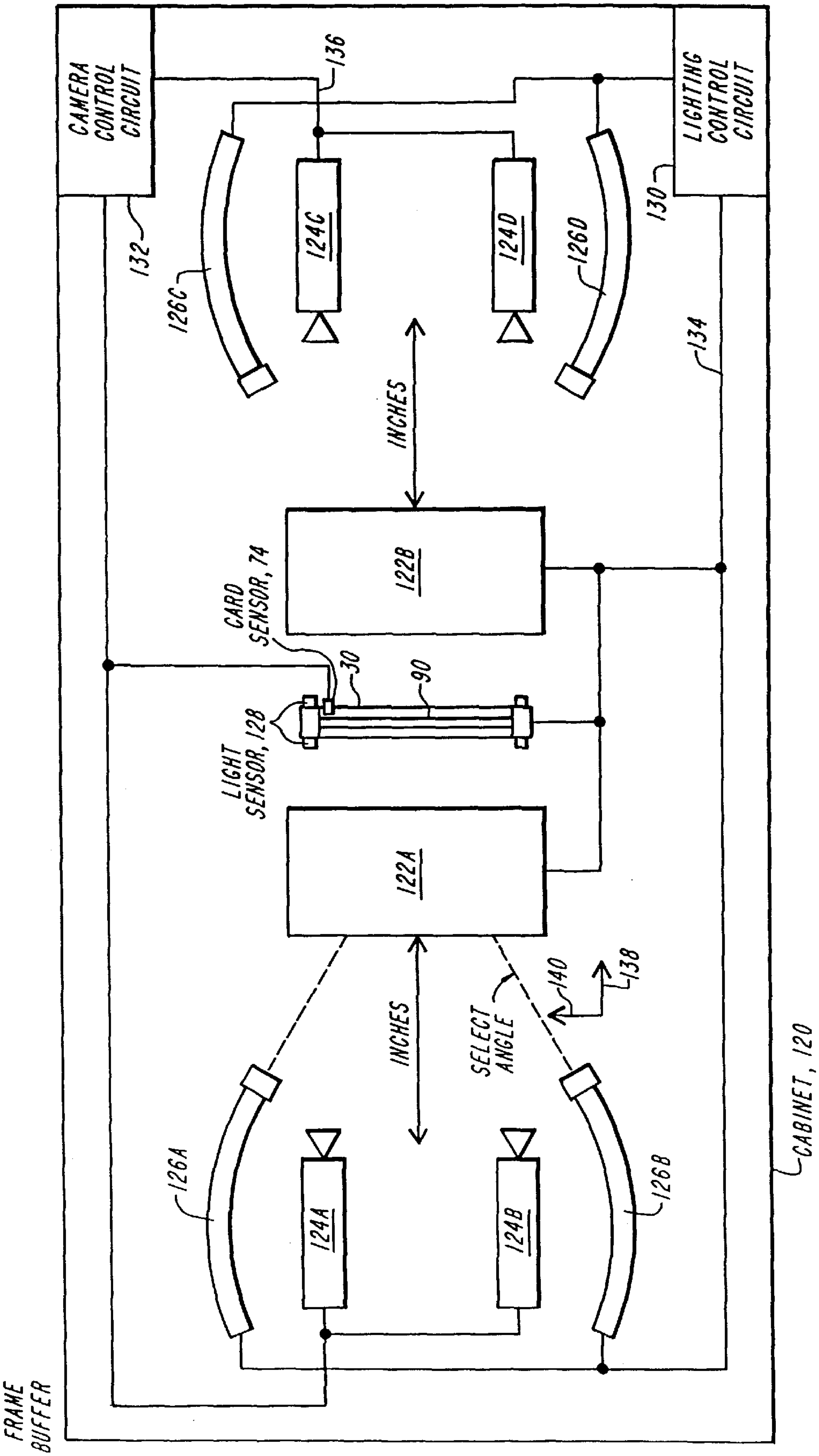
FIG. 4 illustrates in more detail and from an overhead perspective, the lighting control unit of the system depicted in FIG. 1.
Figure 5:
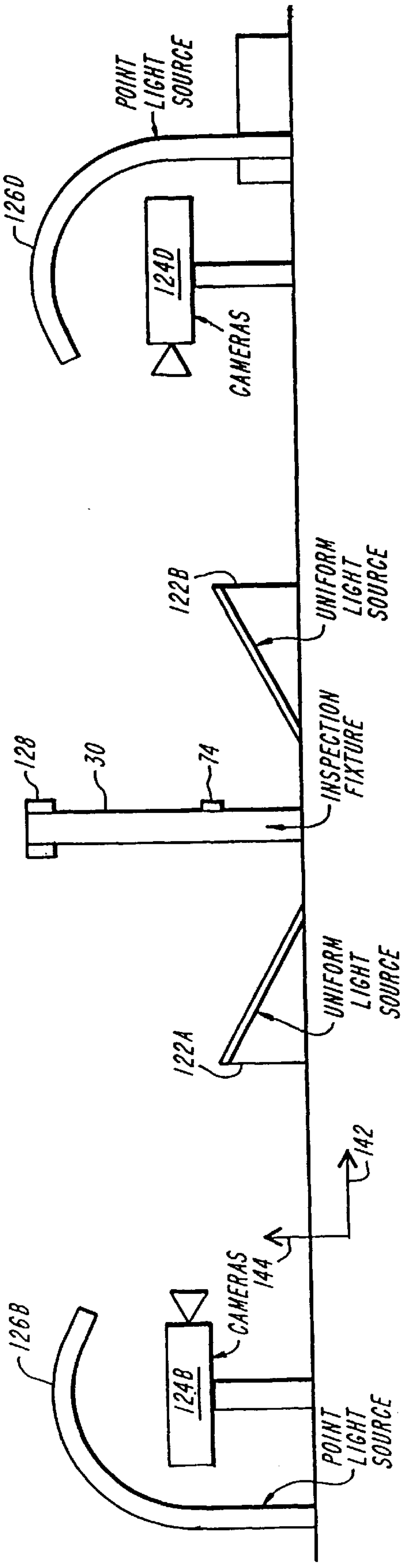
FIG. 5 illustrates in more detail and from a side perspective, the lighting control unit of the system depicted in FIG. 1.

FIGS. 4 and 5 illustrate one embodiment of a cell lighting unit 34 constructed for use with the present invention. The illustrated cell lighting unit 34 includes a cabinet 120, uniform lighting sources 122A and 122B, camera elements 124A–124D, point source lighting units 126A–126D, light sensor 128, lighting control circuit 130, camera control circuit 132, lighting source of electrical harness 134 and camera control circuit harness 136. Alternatively, the cell lighting unit 34 can be an open loop system that has a user selected threshold for the lighting sources 122A and 122B and 126A–126D and can be manufactured without the light sensor 128 for open loop operation.

FIG. 4 illustrates an overhead perspective of the cell lighting unit 34. As depicted in FIG. 4, data card 90 can be placed by the collection unit 28 into the fixture 30. A card sensor 74 can detect the presence of a data card 90 and generate a signal to the CPU 26 indicating the presence of the data card 90 in a position suitable for image acquisition. Light sensors 128 connect to the support fixture 30 and detect the presence and intensity of light radiated against the card 90. The light sensors 128 connect via the electrical harness 134 to the lighting control circuit 130. Similarly, the light sources 122A and 122B and light sources 126A–126D connect via the lighting harness 134 to the lighting control circuit 130. The lighting sources 122A and 122B depicted embodiment are uniform light sources directed at the data card 90 in fixture 30. In the illustrated embodiment a uniform source 122A illuminates the front side of the data card 90 and the uniform light source 122B illuminates the rear side of the data card 90.

As further illustrated by FIG. 4, a point sources 126A–126D are directed to a specific portion of the either the front side or the backside of the data card 90. In the illustrated embodiment the point source 126A is directed to the front left portion of the data card 90 and the point source 126B is directed to the front right portion of the data card 90. Similarly the point sources 126C and 126D are directed to the rear right portion of the data card 90 and the rear left portion of the data card 90 respectively. In a similar fashion, four camera elements 124A–124D are directed to a selected portion of the data card 90. In the illustrated embodiment the camera elements 124A and 124B are directed to the front left portion and the front right portion of the data card 90 respectively. Alternatively, the camera elements 124C and 124D are directed to the rear right portion and rear left portion of the data card 90 respectively. The camera elements 124A–124D connect via the camera control harness 136 to the camera control circuit 132. Both the camera control circuit 132 and the lighting control circuit 130 connect via transmission paths to the CPU 26 of division cell 12.

FIG. 5 illustrates the cell lighting unit 34 from a side perspective that illustrates the selected orientation of the light sources 122A, 122B and 126A–126D relative to the data card 90. In the illustrated embodiment, the uniform light sources 122A and 122B are angled relative to a horizontal plane extending relative to the axis 142. The illustrated uniform light sources 122A and 122B are pitched to illuminate the data card 90 in a manner that illuminates the material behind the holographic overlay attached to the surface of the data card 90. The ability to "see through" the holographic overlay can be essential to being able to do a complete job of inspecting the recorded material on the data card 90. Similarly the ability to image the hologram imprinted on a holographic overlay allows a more complete inspection of the data card 90 to ensure that the holographic overlay has been applied to the data card 90. The transparency of the holograph imprinted in the holographic overlay is understood to be dependent on the polarization angle of illuminating light sources. The light sources 122 and 126 are selected to control the polarization angle of the incident light the data card 90. The uniform light sources 122A and 122B are pitched at angles of 10° and at intensities that are selectable by the lighting control circuit 130 dependent upon the ambient light surrounding the identification card 90 being inspected. The illumination sources 122A and 122B having these characteristics, illuminate the data card 90 sufficiently for the camera elements 124A–124D to acquire images of the printed material behind the holograms and the holographic overlay. In a preferred embodiment of the invention, the illumination sources 122A and 122B are angled at 15° and are spaced a distance of 3 inches from the support fixture 30 in order to minimize glare, optimize contrast and to remove as much as possible the image of the hologram on the image signal acquired by the camera elements 124A–124D.

Inspection of the hologram fixed to the data card 90 can be facilitated by the sources 126A–126D. Sources 126A–126D can illuminate data card 90 with polarized light having a polarization and an angle of incidence selected to maximize the appearance of the hologram in the image signal captured by the camera elements 124A–124D. In a preferred embodiment of the invention the cell lighting unit 34 includes a cabinet 120 that surrounds the lighting sources 122 and 126, the camera elements 124 and the data card 90 in the support fixture 30 in order to reduce the ambient light incident on the data card 90. In an optional yet preferred embodiment of the invention, the support fixture 30 includes the light sensor element 128 for detecting the illumination incident on the data card 90 and for generating an illumination signal transmitted via a transmission path to the CPU 26. The CPU 26 can adjust the illumination intensity of the lighting sources 122 and 126 to compensate for the ambient light within the cabinet 120.

In another preferred yet optional embodiment of the invention, each illumination source 126A–126D is independently controlled by the lighting control circuit 130. The lighting control circuit 130 can couple via transmission path to the CPU 26. Lighting control circuit 130 can be an electrical circuit card assembly of the type commonly used for providing power to lighting sources. The circuit card assembly can include an interface coupled to the CPU 26, a power supply, and a set of relays. The lighting control circuit 130 can detect signals transmitted via the transmission path from the CPU 26 and can activate the lighting sources 122A, 122B and 126A–126D through the relays responsive to the signals generated by CPU 26. The construction of lighting control circuits is well known in the art of electrical engineering and the practice of alternative lighting control circuits does not depart from the scope of the present invention. It should be apparent to one of ordinary skill in the art that the cell lighting unit 34 depicted in FIGS. 4 and 5 are merely illustrative of one embodiment of a cell lighting unit 34 that can be practiced with the present invention. Alternatively, cell lighting unit 34 can be constructed for practice with the present invention and can include more or less camera elements, more or less lighting units and alternative lighting and camera control systems.

In a further aspect of the present invention, the system 10 illustrated in FIG. 1 provides a identification card manufacturing and inspection system that achieves automated control of the manufacturing process. In particular, the inspection system cell 12 can optionally include a CPU 26 that has a program element for monitoring select characteristics of the data cards 90 being manufactured by the system 10. Preferably this program element is an automated control program that measures select characteristics of the manufactured data cards 90 to determine the operating conditions of the system 10.

For example, the control program element of CPU 26 can monitor the gray scale of text data recorded onto each data card 90. The control element can compare between successive runs of data cards 90 the gray scale of text data recorded onto each data card 90. The control element generates a gray scale signal that can be stored in the memory element of CPU 26 and that indicates the relative darkness of text recorded onto the data cards. The control element 26 can display this information on a optional monitor element (not shown) for review by a system operator. The system operator can determine from this displayed signal whether the system 10 requires more ink, or requires that a printing head of the recorder 14 be more closely contacted to the blank cards moving through the recording unit 14. Similarly, the control element of CPU 26 can measure the relative orientation of text data being recorded onto the data card 90. The control program element can generate an orientation signal that indicates the relative angle of orientation of text recorded onto the data card 90 over successive runs of the system 10. This signal can also be displayed on the optional monitor so that a system operator can determine if the mechanical assembly that holds data card 90 while information is recorded thereon, is beginning to loosen or whether another type of mechanical failure is beginning to effect the recording of data onto blank data cards. The control program element preferably includes an averaging unit that operates the CPU 26 to generate an average signal for each of the monitored characteristics, that represents the average value of the characteristic during the manufacture of data cards 90 requested by a single manufacturing batch request signal. These average characteristic signals can be stored in the data memory of the CPU 26.

In this way, the system 10 provides an automated system for manufacturing and inspecting identification cards that provides an operator with information representative of the operating condition of the system 10 and can provide the operator with information indicative of a failure, such as an empty ink cartridge, before the failure occurs. Furthermore, the average characteristic signals provide an operator with information representative of changes of the operating condition of the system 10 between different manufacturing batches.

In a further aspect of the present invention, methods are provided for manufacturing and inspecting identification cards. These methods, which have been described and made apparent with reference to the systems described above, can include steps of collecting information such as image information, demographic information, identifying information, and other such information commonly recorded onto an identification card and assembling the information into a data record that includes an identification signal representative of that particular data record. Each data record can be used for generating one individual identification card or one particular type of identification card. In a further step a network job builder can generate a manufacturing batch request signal that includes one or more data records signals. The manufacturing batch request signal can be transferred in a subsequent step to a systems, such as the system 10, illustrated in FIG. 1, for manufacturing an identification card for each of the data record signals in a manufacturing batch request.

In a further step, the system 10 records information including the identification signal onto a series of blank cards to generate data cards 90. The manufactured data cards 90 are passed to a vision inspection cell 12 that reads the identification signal encoded onto the data card 90 and requests from an memory element the complete data record associated with that identification signal. The vision inspection cell 12 acquires images of the data card 90 and compares the acquired images with the image signals stored in the associated data record. The vision inspection cell 12 generates as a result of the comparison, a signal, such as a failed to manufacture signal or a successful manufacture signal that indicates whether the recording unit 14 has successfully recorded the correct data, in the correct format onto the data card 90.

In one practice of the invention, the inspection cell passes each card generated by the recording unit 14 onto a packaging unit 16. In a further step, the packaging unit 16 receives each data card 90 in sequence from the vision inspection cell 12. Each data card 90 is placed in an output hopper 62 and the packaging unit removes one card from the output hopper 62 while simultaneously receiving a identification signal from the vision inspection cell. The packaging unit 16 includes a signal decoding unit that can decode the identification signal recorded onto the data card 90 the recorded identification signal is compared with the identification signal sent from the vision inspection cell 12, and if the signals match, the packaging unit 16 places the data card 90 into a carrier element, requests the completed data record from the vision inspection cell 12, and records demographic data, such as address data, onto the carrier element for delivery through the mail. Alternatively, if the identification signal decoded by the packaging unit 16 does not match with the identification signal recorded onto the data card 90, the packaging unit 16 places the data card 90 in a rejection bin.

The invention has been described above with reference to certain illustrated embodiments. The description of the illustrated embodiments provide a more fuller understanding of the invention, however, the invention is not to be limited to the illustrated embodiments of the description thereof, and the invention is to be interpreted according to claims set forth herein.

We claim:

1. Apparatus for manufacturing a series of data cards, comprising production means for recording information onto one or more blank cards, said production means having a memory element separate from said data cards for storing a plurality of different data record signals each data record signal being associated with a respective one of said data cards and each having image information representative of one of a plurality of different images, recording means for recording image information from said data records on to respective ones of said blank cards, and inspection means, coupled to said production means, for visually inspecting said data cards, and having an image acquisition element for generating an image signal representative of said image information recorded on each said data card, and image processing means for comparing said generated image signal with said respective data record signal and for generating a comparison signal representative of the accuracy of the recorded image relative to said data record signal.

2. Apparatus according to claim 1 wherein said inspection means includes means for disposing said data cards in a support element after recording for the purpose of visual inspection.

3. Apparatus according to claim 1 wherein said production means includes means for recording onto said blank cards an identification signal representative of one of said data record signals.

4. Apparatus according to claim 3 wherein said means for recording an identification signal includes a barcode recording element.

5. Apparatus according to claim 1 wherein said inspection means includes means for decoding an identification signal recorded onto said data cards.

6. Apparatus according to claim 5 wherein said means for decoding includes a barcode reader element arranged for optically reading a barcode signal representative of said identification signal.

7. Apparatus according to claim 1 wherein said blank cards include a magnetic stripe and wherein each said data record signal includes an identification signal for identifying said data record signals, said recording means includes a unit for recording onto each said blank card a signal representative of said identification signal, and said inspection means includes a magnetic strip reader unit for reading said identification signal on each said data card and for retrieving said data record signal as a function of said identification signal.

8. Apparatus according to claim 1 wherein said recording means includes means for recording image information on both sides of said data card, and said inspection means includes a camera element for generating said image signal representative of image information recorded on both sides of said data card.

9. Apparatus according to claim 1 wherein said inspection means includes a lighting unit for illuminating said data card with a selected intensity of light.

10. Apparatus according to claim 9 wherein said lighting unit includes a polarized light source for illuminating said data card with light of a selected polarization.

11. Apparatus according to claim 1 comprising packaging means, coupled to said inspection means, for disposing each said data card in a respective carrier element and for printing information from said data record signal onto said carrier element.

12. Apparatus according to claim 1 wherein said image processing means include a processor element having an operating program for spatially filtering said image signal to have a select aspect ratio.

13. Apparatus according to claim 1 wherein said image acquisition element includes an adjustable lens for generating image signals having a select pixel density.

14. Apparatus according to claim 1 wherein said image processing means includes a processor element having an operating program for generating a pixel density signal of an image region, and for comparing pixel density signals of said image signal and sad data record signal.

15. Apparatus according to claim 1 wherein said image acquisition element generates color image signals representative of color images, and said image processing means includes a program element for comparing said color image signals with said data record signal.

16. Apparatus for manufacturing identification cards from collected data, comprising database memory element separate from said identification cards and arranged for storing one or more data record signals each representative of different information, to be recorded onto a blank card, job builder means for generating a batch signal representative of instructions to generate said identification cards from said stored data record signals, recording means for recording different data record signals onto individual ones of said blank cards responsive to said batch signal, inspection means, coupled to a production means, for visually inspecting said identification cards, and for generating a failed to manufacture signal as a function of a comparison between said recorded information and said data record signal, and packaging means for disposing said identification cards into carrier elements and for printing information onto each said carrier element from said data record as a function of said failed to manufacture signal.

17. Apparatus according to claim 16 wherein said data record signal includes an identification signal, and said recording unit includes means for recording a signal onto each said blank card representative of said identification signal.

18. Apparatus according to claim 17 wherein said inspection means includes decoding means for decoding a signal recorded onto each said data card and representative of said identification signal.

19. Apparatus according to claim 18 wherein said inspection means includes interface means for collecting from said job builder means said data record signal that corresponds to said identification signal recorded on said identification card being inspected.

20. Method for manufacturing a series of data cards, comprising the steps of storing one or more data record signals each having image information representative of one or more images and information representative of an identification signal that associates one of said data record signals with one of said data cards, recording said image information and identification signals from said data record signals on to respective ones of blank cards, generating an image signal representative of said image information recorded on each said data card, decoding said identification signal recorded onto one of said data cards for comparing said generated image signal with said respective data record signal, and generating a comparison signal representative of the accuracy of the recorded image relative to said data record signal.

21. Apparatus of claim 9 wherein said selected intensity of light is responsive to the ambient light incident on the data card.

22. Apparatus of claim 9 wherein said lighting unit includes a light sensing element and said selected intensity of light is responsive to said light sensing element.

23. Apparatus of claim 9 wherein said lighting unit includes a uniform light source.

24. Apparatus of claim 9 wherein said lighting unit further comprises a cabinet disposed to control ambient light incident on the data card.

25. Apparatus of claim 9 wherein said lighting unit includes a point light source disposed to illuminate a selected point on the data card.

26. Apparatus of claim 23 wherein said uniform light source is disposed to illuminate said data card from an angle between ten degrees and fifteen degrees.

27. Apparatus of claim 10 wherein said polarization light source is disposed to illuminate the data card at an angle selected to minimize the response due to an overlay formed on the card.

28. Apparatus of claim 10 wherein said polarization light source is disposed to illuminate the data card at an angle selected to maximize the response due to an overlay formed on the card.

* * * * *